US012652660B2

(12) United States Patent
Xu et al.

(10) Patent No.: US 12,652,660 B2
(45) Date of Patent: Jun. 9, 2026

(54) DYNAMIC BANDWIDTH PART SWITCHING FOR CONTROL MESSAGE MONITORING

(71) Applicant: QUALCOMM Incorporated, San Diego, CA (US)

(72) Inventors: Zhuoqi Xu, Shanghai (CN); Yuankun Zhu, Shanghai (CN); Pan Jiang, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 18/260,228

(22) PCT Filed: Feb. 1, 2021

(86) PCT No.: PCT/CN2021/074596
§ 371 (c)(1),
(2) Date: Jun. 30, 2023

(87) PCT Pub. No.: WO2022/160326
PCT Pub. Date: Aug. 4, 2022

(65) Prior Publication Data
US 2024/0080830 A1     Mar. 7, 2024

(51) Int. Cl.
*H04W 72/0457* (2023.01)
*H04W 28/02* (2009.01)
*H04W 72/231* (2023.01)

(52) U.S. Cl.
CPC ... *H04W 72/0457* (2023.01); *H04W 28/0278* (2013.01); *H04W 72/231* (2023.01)

(58) Field of Classification Search
CPC ......... H04W 72/0457; H04W 28/0278; H04W 72/231; H04W 72/21; H04W 72/0453; H04L 5/0098
See application file for complete search history.

(56) References Cited

U.S. PATENT DOCUMENTS 11,051,220 B1 *   6/2021   Song ..................... H04W 8/245
2018/0279131 A1 *   9/2018   Mcmenamy .......... H04W 16/14
(Continued)

FOREIGN PATENT DOCUMENTS

CN          111031602 A  *  4/2020   ............ H04W 72/53
CN          107635249 B  *  6/2022
WO   WO-2022160326 A1 *  8/2022   ........... H04L 5/0098

OTHER PUBLICATIONS

Huawei, et al., "User Plane Impacts for Bandwidth Parts," 3GPP Draft, 3GPP TSG-RAN WG2 #99bis, R2-1710217, User Plane Impacts for Bandwidth Parts, 3rd Generation Partnership Project (3GPP), Mobile Competence Centre, 650, Route Des Lucioles, F-06921, Sophia-Antipolis Cedex, France, vol. RAN WG2, No. Prague, CZ, Oct. 9, 2017- Oct. 13, 2017, Oct. 8, 2017 (Oct. 8, 2017), XP051342269, 6 pages, Sections 2.1, 2.4, pp. 2,3,5.
(Continued)

*Primary Examiner* — John D Blanton
(74) *Attorney, Agent, or Firm* — Paul M. McAdams; Harrity & Harrity, LLP

(57)          ABSTRACT

Various aspects of the present disclosure generally relate to wireless communication. In some aspects, a user equipment (UE) may activate a first bandwidth part (BWP), of a set of candidate BWPs, having a first bandwidth size. The UE may receive, based at least in part on satisfaction of a buffer status report (BSR) threshold for a time period, an indication to activate a second BWP, of the set of candidate BWPs, having a second bandwidth size. Numerous other aspects are described.

30 Claims, 9 Drawing Sheets

500

(56)                References Cited

U.S. PATENT DOCUMENTS

| | | | | |
|---|---|---|---|---|
| 2018/0284864 | A1* | 10/2018 | HomChaudhuri | G06F 1/324 |
| 2019/0174449 | A1* | 6/2019 | Shan | H04W 60/04 |
| 2019/0174466 | A1* | 6/2019 | Zhang | H04L 5/0057 |
| 2019/0191464 | A1* | 6/2019 | Loehr | H04W 74/0833 |
| 2020/0059345 | A1* | 2/2020 | Pelletier | H04L 1/16 |
| 2021/0067391 | A1* | 3/2021 | Sengupta | H04L 27/2614 |
| 2021/0084536 | A1* | 3/2021 | Chou | H04W 36/0085 |
| 2021/0092008 | A1* | 3/2021 | Yi | H04J 1/02 |
| 2021/0297199 | A1* | 9/2021 | Miao | H04L 1/1819 |
| 2021/0298048 | A1* | 9/2021 | Sosnin | H04W 72/046 |
| 2021/0345383 | A1* | 11/2021 | Tesanovic | H04W 72/21 |
| 2021/0345454 | A1* | 11/2021 | Dhanapal | H04W 76/27 |
| 2022/0078872 | A1* | 3/2022 | Shrestha | H04W 68/12 |
| 2022/0095320 | A1* | 3/2022 | Sakhnini | H04W 52/365 |
| 2022/0150038 | A1* | 5/2022 | Lee | H04B 1/006 |
| 2022/0167408 | A1* | 5/2022 | Lee | H04W 74/0866 |
| 2022/0182120 | A1* | 6/2022 | Sergeev | H04B 7/0469 |
| 2022/0182951 | A1* | 6/2022 | Zhou | H04W 52/52 |
| 2022/0182995 | A1* | 6/2022 | Raghavan | H04B 7/088 |
| 2022/0183053 | A1* | 6/2022 | Li | H04W 74/006 |
| 2022/0183064 | A1* | 6/2022 | Talarico | H04W 74/0808 |
| 2022/0190939 | A1* | 6/2022 | Zhang | H04B 17/336 |
| 2022/0191916 | A1* | 6/2022 | Talarico | H04L 27/2607 |
| 2022/0200675 | A1* | 6/2022 | Raghavan | H04B 7/0695 |
| 2022/0201757 | A1* | 6/2022 | Cruz | H04L 1/1896 |
| 2022/0210675 | A1* | 6/2022 | Cui | H04W 36/0088 |
| 2022/0210860 | A1* | 6/2022 | Chin | H04W 72/23 |
| 2022/0216964 | A1* | 7/2022 | Mondal | H04L 5/0023 |
| 2022/0256436 | A1* | 8/2022 | Guo | H04L 47/34 |
| 2022/0272706 | A1* | 8/2022 | Sengupta | H04W 52/18 |
| 2022/0312459 | A1* | 9/2022 | Yang | H04L 1/0025 |
| 2023/0072763 | A1* | 3/2023 | Kim | H04W 74/0841 |
| 2023/0135699 | A1* | 5/2023 | Liao | H04W 4/50 |
| | | | | 370/252 |
| 2023/0216639 | A1* | 7/2023 | Wang | H04L 5/0035 |
| | | | | 370/329 |
| 2023/0224953 | A1* | 7/2023 | Xiong | H04L 1/0009 |
| | | | | 370/329 |
| 2023/0239730 | A1* | 7/2023 | Esswie | H04W 56/00 |
| | | | | 370/328 |
| 2023/0325241 | A1* | 10/2023 | Herdrich | G06F 9/5016 |
| | | | | 718/104 |
| 2023/0379092 | A1* | 11/2023 | Chin | H04L 1/1822 |
| 2023/0389125 | A1* | 11/2023 | Islam | H04W 72/535 |
| 2024/0080830 | A1* | 3/2024 | Xu | H04L 5/0098 |

OTHER PUBLICATIONS

International Search Report and Written Opinion—PCT/CN2021/074596—ISA/EPO—Aug. 2, 2021.

* cited by examiner

400

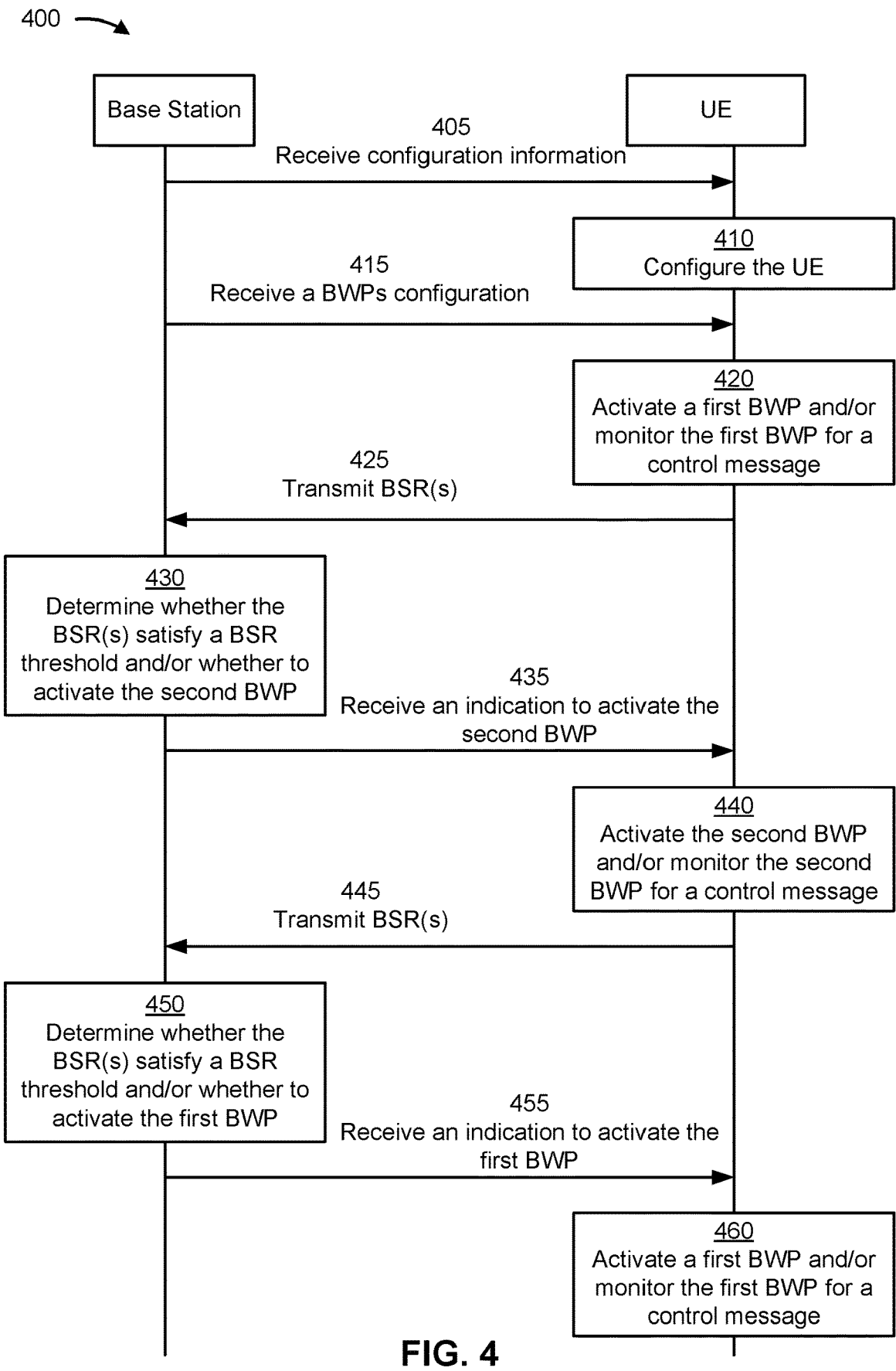

Base Station

UE

405
Receive configuration information

410
Configure the UE

415
Receive a BWPs configuration

420
Activate a first BWP and/or monitor the first BWP for a control message

425
Transmit BSR(s)

430
Determine whether the BSR(s) satisfy a BSR threshold and/or whether to activate the second BWP 435
Receive an indication to activate the second BWP 440
Activate the second BWP and/or monitor the second BWP for a control message 445
Transmit BSR(s)

450
Determine whether the BSR(s) satisfy a BSR threshold and/or whether to activate the first BWP 455
Receive an indication to activate the first BWP 460
Activate a first BWP and/or monitor the first BWP for a control message

Activate a first BWP, of a set of candidate BWPs, having a first bandwidth size

610

Receive, based at least in part on satisfaction of a BSR threshold for a time period, an indication to activate a second BWP, of the set of candidate BWPs, having a second bandwidth size

620

600

710 — Transmit, to a UE an indication to activate a first BWP, of a set of candidate BWPs, having a first bandwidth size 720 — Transmit, based at least in part on satisfaction of a BSR threshold for a time period, an indication for the UE to activate a second BWP, of the set of candidate BWPs, having a second bandwidth size

700

DYNAMIC BANDWIDTH PART SWITCHING FOR CONTROL MESSAGE MONITORING

CROSS-REFERENCE TO RELATED APPLICATION

This Patent Application is a 371 national stage of PCT Application No. PCT/CN2021/074596 filed on Feb. 1, 2021, entitled "DYNAMIC BANDWIDTH PART SWITCHING FOR CONTROL MESSAGE MONITORING," and assigned to the assignee hereof. The disclosure of the prior Application is considered part of and is incorporated by reference into this Patent Application in its entirety.

FIELD OF THE DISCLOSURE

Aspects of the present disclosure generally relate to wireless communication and to techniques and apparatuses for dynamic bandwidth part switching for control message monitoring.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/ LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes activating a first bandwidth part (BWP), of a set of candidate BWPs, having a first bandwidth size; and receiving, based at least in part on satisfaction of a buffer status report (BSR) threshold for a time period, an indication to activate a second BWP, of the set of candidate BWPs, having a second bandwidth size.

In some aspects, a method of wireless communication performed by a base station includes transmitting, to a UE an indication to activate a first BWP, of a set of candidate BWPs, having a first bandwidth size; and transmitting, based at least in part on satisfaction of a BSR threshold for a time period, an indication for the UE to activate a second BWP, of the set of candidate BWPs, having a second bandwidth size.

In some aspects, a UE for wireless communication includes a memory; and one or more processors operatively coupled to the memory, the memory and the one or more processors configured to: activate a first BWP, of a set of candidate BWPs, having a first bandwidth size; and receive, based at least in part on satisfaction of a BSR threshold for a time period, an indication to activate a second BWP, of the set of candidate BWPs, having a second bandwidth size.

In some aspects, a base station for wireless communication includes a memory; and one or more processors operatively coupled to the memory, the memory and the one or more processors configured to: transmit, to a UE an indication to activate a first BWP, of a set of candidate BWPs, having a first bandwidth size; and transmit, based at least in part on satisfaction of a BSR threshold for a time period, an indication for the UE to activate a second BWP, of the set of candidate BWPs, having a second bandwidth size.

In some aspects, a non-transitory computer-readable medium storing a set of instructions for wireless communication includes one or more instructions that, when executed by one or more processors of a UE, cause the UE to: activate a first BWP, of a set of candidate BWPs, having a first bandwidth size; and receive, based at least in part on satisfaction of a BSR threshold for a time period, an indication to activate a second BWP, of the set of candidate BWPs, having a second bandwidth size.

In some aspects, a non-transitory computer-readable medium storing a set of instructions for wireless communication includes one or more instructions that, when executed by one or more processors of a base station, cause the base station to: transmit, to a UE an indication to activate a first BWP, of a set of candidate BWPs, having a first bandwidth size; and transmit, based at least in part on satisfaction of a BSR threshold for a time period, an indication for the UE to activate a second BWP, of the set of candidate BWPs, having a second bandwidth size.

In some aspects, an apparatus for wireless communication includes means for activating a first BWP, of a set of candidate BWPs, having a first bandwidth size; and means for receiving, based at least in part on satisfaction of a BSR threshold for a time period, an indication to activate a second BWP, of the set of candidate BWPs, having a second bandwidth size.

In some aspects, an apparatus for wireless communication includes means for transmitting, to a UE an indication to activate a first BWP, of a set of candidate BWPs, having a first bandwidth size; and means for transmitting, based at least in part on satisfaction of a BSR threshold for a time period, an indication for the UE to activate a second BWP, of the set of candidate BWPs, having a second bandwidth size.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4 and 5 are diagrams illustrating examples associated with dynamic bandwidth part switching for control message monitoring, in accordance with the present disclosure.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
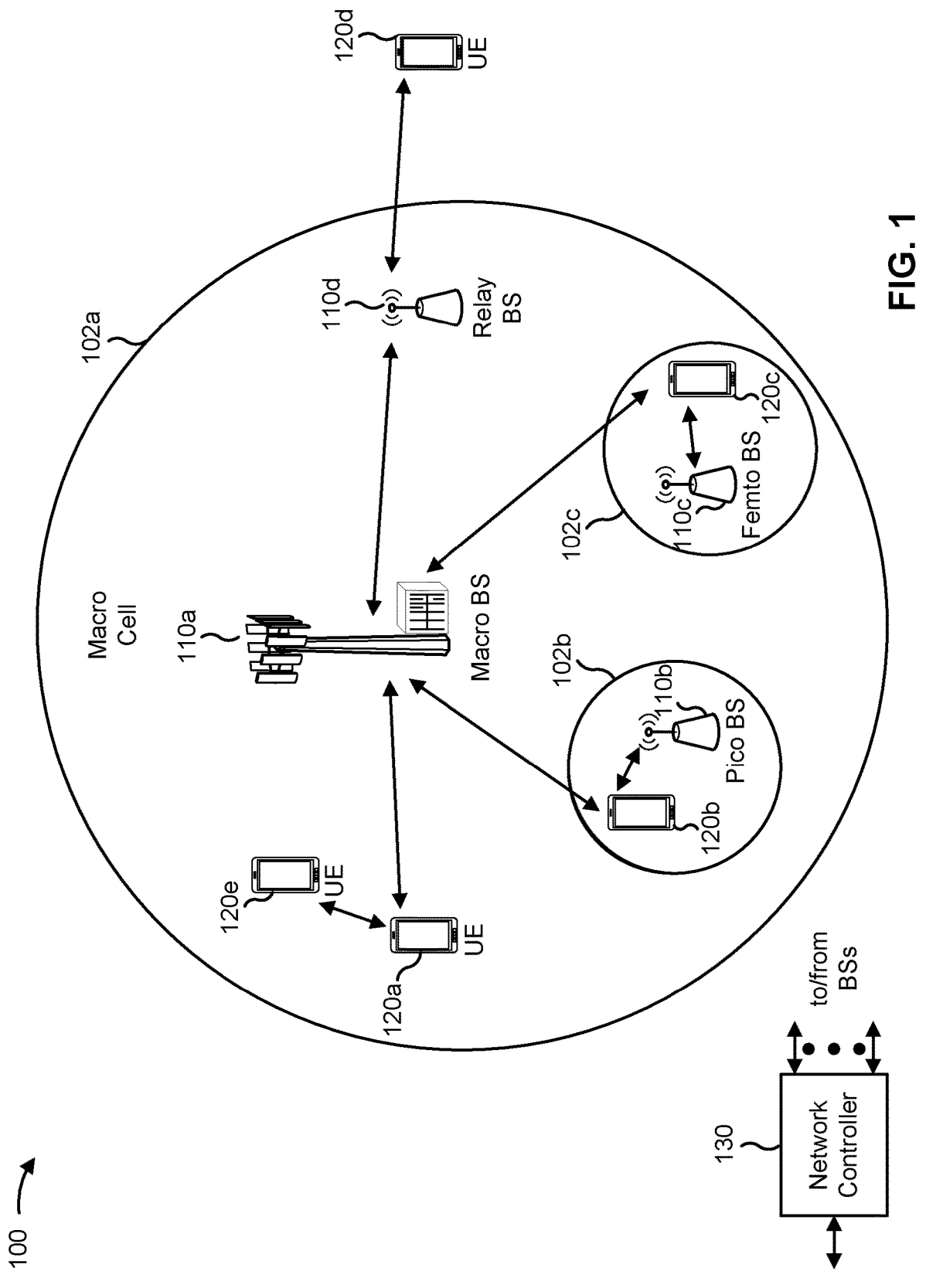
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
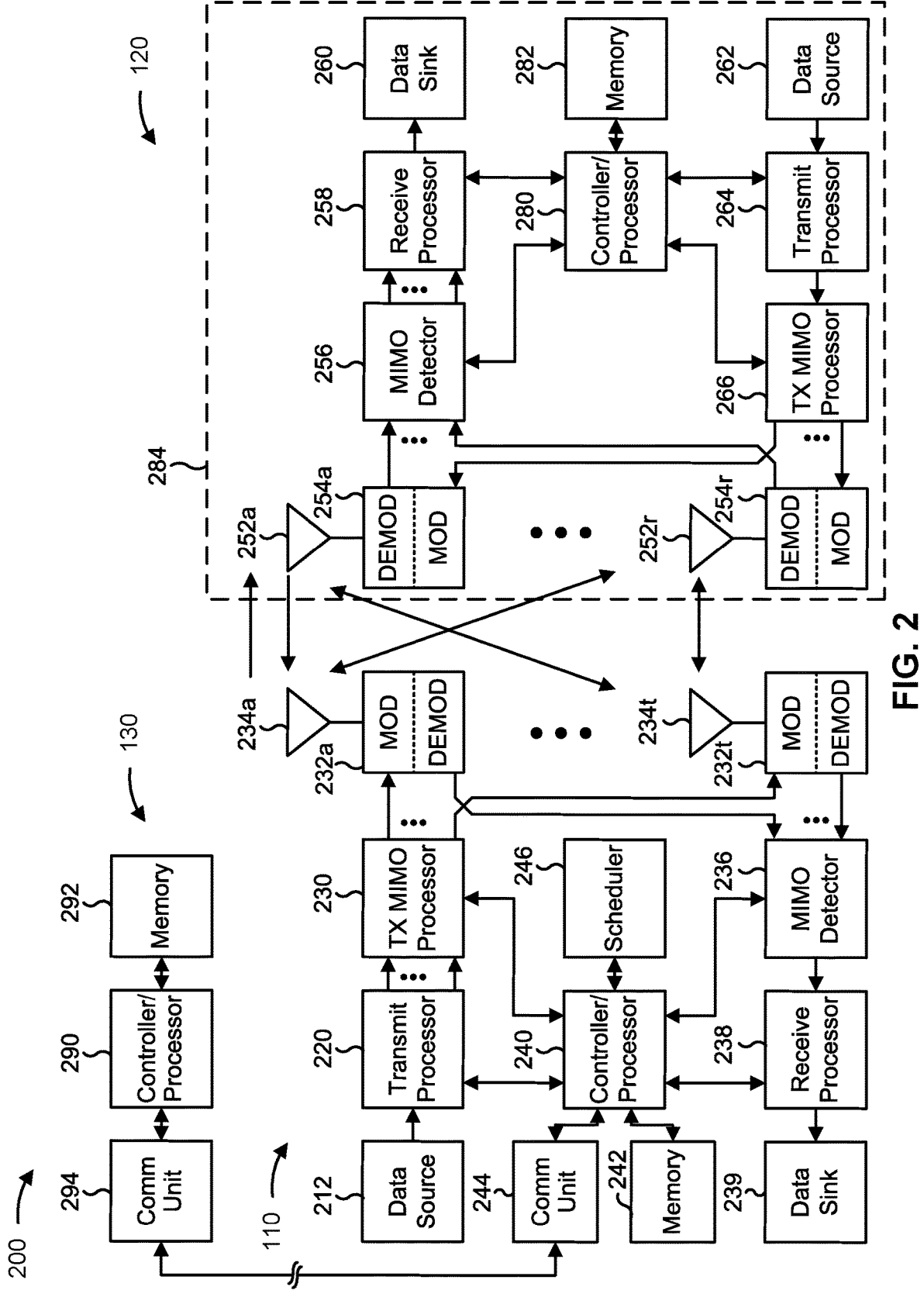
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-7.

Controller/processor 240 of base station 110, controller/processor 280 of UE 120, and/or any other component(s) of FIG. 2 may perform one or more techniques associated with dynamic bandwidth part switching for control message monitoring, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE includes means for activating a first BWP, of a set of candidate BWPs, having a first bandwidth size; and/or means for receiving, based at least in part on satisfaction of a BSR threshold for a time period, an indication to activate a second BWP, of the set of candidate BWPs, having a second bandwidth size. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for monitoring the second BWP for a control message based at least in part on reception of the indication to activate the second BWP.

In some aspects, the UE includes means for activating the first BWP, after activating the second BWP, based at least in part on one or more of: reception of an indication to activate the first BWP, or satisfaction of a BWP switching time In some aspects, the UE includes means for receiving a BWPs configuration that indicates configurations of the set of candidate BWPs.

In some aspects, the UE includes means for transmitting one or more BSRs that include BSR indices to indicate whether the UE has data buffered for transmission.

In some aspects, the UE includes means for transmitting one or more BSRs with an average BSR index that is less than the BSR threshold, wherein the first bandwidth size is larger than the second bandwidth size.

In some aspects, the UE includes means for transmitting one or more BSRs with an average BSR index that is greater than the BSR threshold, wherein the second bandwidth size is larger than the first bandwidth size.

In some aspects, the UE includes means for receiving the indication to activate the second BWP via one or more of downlink control information, medium access control signaling, or radio resource control signaling.

In some aspects, the base station includes means for transmitting, to a UE an indication to activate a first BWP, of a set of candidate BWPs, having a first bandwidth size; or means for transmitting, based at least in part on satisfaction of a BSR threshold for a time period, an indication for the UE to activate a second BWP, of the set of candidate BWPs, having a second bandwidth size. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting, after transmitting the indication for the UE to activate the second BWP, an indication for the UE to activate the first BWP.

In some aspects, the base station includes means for transmitting a BWPs configuration that indicates configurations of the set of candidate BWPs.

In some aspects, the base station includes means for receiving, from the UE, one or more BSRs that include BSR indices to indicate whether the UE has data buffered for transmission.

In some aspects, the base station includes means for receiving one or more BSRs with an average BSR index that is less than the BSR threshold, wherein the first bandwidth size is larger than the second bandwidth size.

In some aspects, the base station includes means for receiving one or more BSRs with an average BSR index that is greater than the BSR threshold, wherein the second bandwidth size is larger than the first bandwidth size.

In some aspects, the base station includes means for determining the BSR threshold based at least in part on traffic conditions of a cell associated with the base station.

In some aspects, the base station includes means for determining a length of the time period based at least in part on traffic conditions of a cell associated with the base station.

In some aspects, the base station includes means for transmitting the indication for the UE to activate the second BWP via one or more of downlink control information, medium access control signaling, or radio resource control signaling.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
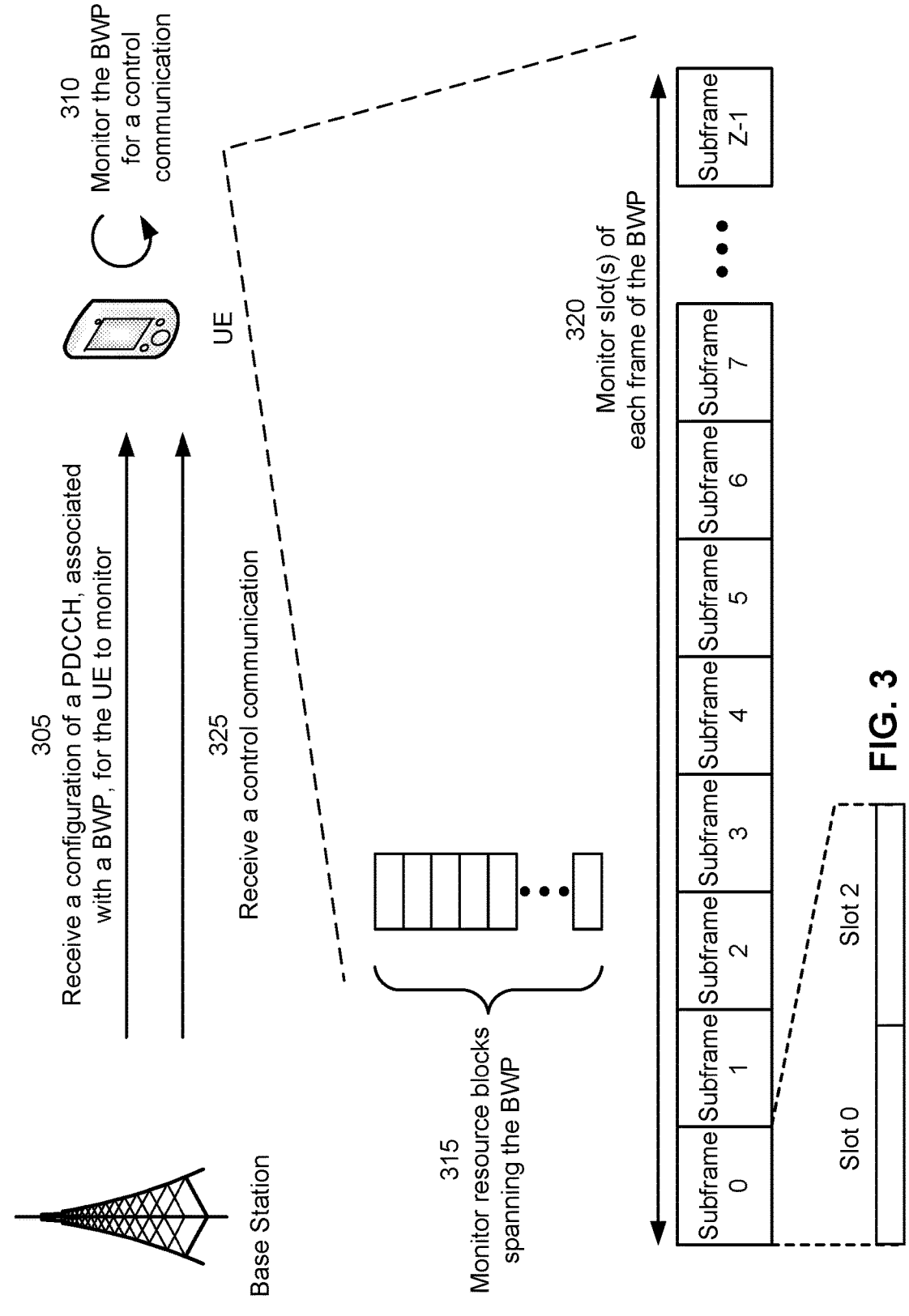
FIG. 3 is a diagram illustrating an example of control message monitoring, in accordance with the present disclosure.

FIG. 3 is a diagram illustrating an example 300 of control message monitoring, in accordance with the present disclosure. As shown in FIG. 3, a UE may communicate with a base station. The UE may be in a radio resource control (RRC) state for communicating with the base station. For example, the UE may be in an RRC connected (e.g., RRC_CONNECTED) state. The UE may be configured to monitor a downlink bandwidth for control signaling, such as downlink control information (DCI).

As shown by reference number 305, the UE may receive, and the base station may transmit, a configuration of a physical downlink control channel (PDCCH), associated with a BWP, for the UE to monitor. The configuration may indicate one or more parameters associated with the PDCCH and/or monitoring of the PDCCH. For example, the configuration may include an indication (e.g., locationAndBandwidth) of a number of resource blocks occupied by a BWP associated with the PDCCH. The configuration may include an indication (e.g., frequencyDomainResources) of a number of resource blocks occupied by the PDCCH. Additionally, or alternatively, the configuration may include an indication (e.g., monitoringSlotPeriodicityAndOffset) of a monitoring period associated with the PDCCH. The configuration may further include an indication (e.g., monitoringSymbolsWithinSlot) of one or more symbols in each slot that are to be monitored by the UE for PDCCH communications.

As shown by reference number 310, the UE may monitor the BWP for a control communication. For example, the UE may monitor the BWP for DCI that schedules a downlink communication and/or an uplink communication.

As shown by reference number 315, monitoring the BWP for the control communication may include monitoring resource blocks spanning the BWP. For example, the UE may be configured to measure each resource block within the BWP or a set of resource blocks within the BWP. A number of resource blocks monitored by the UE may be based at least in part on a bandwidth size of the BWP.

As shown by reference number 320, monitoring the BWP for the control communication may include monitoring one or more slots of each frame of the BWP. For example, the UE may be configured to monitor at least one symbol of each slot of each frame of the BWP or a set of slots within the BWP.

As shown by reference number 325, the UE may receive a control communication. For example, the UE may receive the control communication based at least in part on monitoring the BWP for the control communication.

As indicated above, FIG. 3 is provided as an example. Other examples may differ from what is described with regard to FIG. 3.

In some networks, such as described with reference to FIG. 3, a UE may be configured to monitor a BWP for a control communication. The UE may monitor a number of resources (e.g., resource elements) that is based at least in part on a bandwidth size of the BWP. During a frame of a PDCCH that spans the BWP, the UE may be configured to monitor a number of resources that is based at least in part on a combination of a number of slots within the PDCCH and a number of resource blocks within the frame of the PDCCH. The number of resource blocks within the frame of the PDCCH may be based at least in part on a combination of the bandwidth size of the BWP and a time duration of the PDCCH.

Based at least in part on the UE monitoring a number of resources that is based at least in part on a bandwidth size of the BWP, the UE may be configured to monitor a same number of resources regardless of an amount of traffic associated with the UE (e.g., an amount of previous traffic and/or an amount of expected traffic, among other examples). In this way, the UE may consume computing, communication, and/or power resources to monitor a BWP having a size that is not based at least in part on an amount of traffic associated with the UE. For example, the UE may monitor a relatively large BWP with the UE has a relatively small amount of recent traffic and/or expected traffic, among other examples.

In some aspects described herein, a UE may be configured with a set of candidate BWPs (e.g., a first BWP and a second BWP). The first BWP may have a first bandwidth size, and the second BWP may have a second bandwidth size. For example, the first BWP may include a full bandwidth, and the second BWP may include a portion of the full bandwidth (e.g., with the second bandwidth size being less than the first bandwidth size). The UE may activate the first BWP (e.g., based at least in part on receiving an indication to activate the first BWP or as a default BWP, among other examples). The UE may transmit one or more BSRs to an associated base station to indicate a request to transmit data. The base station may monitor BSRs received from the UE to determine an amount of traffic associated with the UE (e.g., an amount of previous traffic and/or an amount of expected traffic, among other examples). For example, the base station may determine if the BSRs satisfy a BSR threshold for a time period. Additionally, or alternatively, the base station may determine whether an average BSR index satisfies the BSR threshold during the time period. Based at least in part on satisfaction of the BSR threshold for the time period, the base station may transmit an indication to activate the second BWP for monitoring for a control message. Based at least in part on transmitting the indication to activate the second BWP, the base station may use one or more resources of the second BWP to transmit a control message and/or the UE may monitor resources of the second BWP to receive a control message. Additionally, or alternatively, the base station and/or the UE may deactivate the first BWP, which may include the base station ceasing to use resources of the first BWP to transmit a control message and the UE ceasing to monitor resources of the first BWP (e.g., resources that do not overlap with the second BWP) to receive a control message.

In this way, the UE may conserve computing, communication, and/or power resources based at least in part on monitoring a BWP with a size that is based at least in part on the amount of traffic associated with the UE (e.g., based at least in part on an average BSR index during the time window). For example, the UE may conserve computing, communication, and/or power resources that may have otherwise been used to monitor the first BWP that has a size that is not based at least in part on an amount of traffic associated with the UE (e.g., based at least in part on an average BSR index during the time window).

FIG. 4 is a diagram illustrating an example 400 associated with dynamic bandwidth part switching for control message monitoring, in accordance with the present disclosure. As shown in FIG. 4, a UE (e.g., UE 120) may communicate with a base station (e.g., base station 110). In some aspects, the UE may be in an RRC connected state. The UE and the base station may be part of a wireless network (e.g., wireless network 100).

As shown by reference number 405, the UE may receive configuration information (e.g., from the base station, another base station, and/or the like) and/or may determine the configuration information based at least in part on a communication protocol. In some aspects, the UE may receive the configuration information via one or more of RRC signaling, medium access control control elements (MAC CEs), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to activate a BWP, of a set of candidate BWPs, to monitor for a control message (e.g., DCI and/or a PDCCH communication, among other examples). In some aspects, the configuration information may indicate that the UE is to activate a second BWP of the set of candidate BWPs, based at least in part on receiving an indication to activate the second BWP.

As shown by reference number 410, the UE may configure the UE for communicating with the base station. In some aspects, the UE may configure the UE based at least in part on the configuration information. In some aspects, the UE may be configured to perform one or more operations described herein.

As shown by reference number 415, the UE may receive, and the base station may transmit, a BWPs configuration.

The BWPs configuration may indicate configurations of a set of candidate BWPs. For example, the BWPs configuration may indicate one or more parameters associated with a PDCCH and/or monitoring of a PDCCH for a first BWP and a PDCCH for a second BWP. In some aspects, the BWPs configuration may indicate a number of resource blocks occupied by the first BWP and by the second BWP, a number of resource blocks occupied by the PDCCH of the first BWP and the PDCCH of the second BWP, a monitoring period associated with the PDCCH of the first BWP and the PDCCH of the second BWP, and/or identifications of one or more symbols in each slot that are to be monitored by the UE for PDCCH communications associated with the PDCCH of the first BWP and the PDCCH of the second BWP, among other examples.

In some aspects, the BWPs configuration may indicate a bandwidth size of the candidate BWPs. For example, the first BWP may have a first bandwidth size and the second BWP may have a second bandwidth size that is different from the first bandwidth size. In some aspects, the first BWP may include a full bandwidth and the second BWP may include a portion of the full bandwidth (e.g., with the second bandwidth size being less than the first bandwidth size). Additionally, or alternatively, the first BWP may include a first range of frequencies and the second BWP may include a second range of frequencies that do not overlap or that partially overlap with the first range of frequencies.

As shown by reference number 420, the UE may activate the first BWP and/or may monitor the first BWP for a control message. In some aspects, the UE may activate the first BWP based at least in part on the first BWP being configured as a default BWP, based at least in part on the first BWP having a bandwidth size that is a largest of bandwidth sizes of the candidate BWPs. In some aspects, the UE may activate the first BWP based at least in part on receiving an indication to activate the first BWP. The UE may receive the indication to activate the first BWP in the configuration information, the BWPs configuration, or another communication (e.g., a DCI communication, MAC layer signaling, or RRC signaling).

In some aspects, activation of the first BWP may be associated with a configuration of the base station to use resources of the first BWP to transmit a control message. Additionally, activation of the first BWP may be associated with a configuration of the UE to monitor resources of the first BWP for a control message. In some aspects, the base station may be configured to transmit, and the UE may be configured to receive, a control message via resources of the first BWP based at least in part on the UE activating the first BWP.

As shown by reference number 425, the UE may transmit, and the base station may receive, one or more BSRs. In some aspects, the one or more BSRs may include indices to indicate whether the UE has data buffered for transmission. In some aspects, the UE may transmit the one or more BSRs via MAC signaling (e.g., MAC CEs). In some aspects, the UE may transmit the one or more BSRs via separate communications (e.g., separated in time).

As shown by reference number 430, the base station may determine whether the one or more BSRs satisfy a BSR threshold and/or whether to activate the second BWP. In some aspects, the base station may determine to use activate the first BWP or the second BWP based at least in part on whether the an average BSR index satisfies the BSR threshold during a time period. For example, the base station may determine that the one or more BSRs have an average BSR index that is less than the BSR threshold and may determine to activate the second BWP based at least in part on the first BWP having a bandwidth size that is larger than a bandwidth size of the second BWP. In other words, the base station may determine to activate a BWP with a smaller bandwidth size based at least in part on the average BSR index being less than the BSR threshold.

In some aspects, the base station may determine that the one or more BSRs have an average BSR index that is greater than the BSR threshold and may determine to activate the second BWP based at least in part on the first BWP having a bandwidth size that is smaller than a bandwidth size of the second BWP. In other words, the base station may determine to activate a BWP with a larger bandwidth size based at least in part on the average BSR index being greater than the BSR threshold.

In some aspects, the base station may determine one or more parameters of the BSR threshold based at least in part on one or more conditions. In some aspects, the base station may determine the BSR threshold based at least in part on traffic conditions of a cell associated with the base station. For example, the base station may reduce the BSR threshold based at least in part on high congestion of the cell or may increase the BSR threshold based at least in part on low congestion of the cell. In some aspects, the base station may determine a length of the time period associated with the BSR threshold based at least in part on traffic conditions of the cell. For example, the base station may reduce the length of the time period based at least in part on congestion of the cell.

As shown by reference number 435, the UE may receive, and the base station may transmit, an indication to activate the second BWP. In some aspects, the UE may receive the indication to activate the second BWP via DCI, MAC signaling, and/or RRC signaling, among other examples. For example, the UE may receive the indication as a dynamic indication via DCI and/or MAC signaling. In this way, the UE may be configured to monitor a BWP with a larger or smaller BWP with a reduced latency.

In some aspects, activation of the second BWP may be associated with a configuration of the base station to use resources of the second BWP to transmit a control message. Additionally, activation of the second BWP may be associated with a configuration of the UE to monitor resources of the second BWP for a control message and/or to cease monitoring resources of the first BWP (e.g., a portion of the first BWP that does not overlap with the first BWP) for a control message. In some aspects, the base station may transmit, and the UE may receive, a control message via resources of the second BWP based at least in part on the base station transmitting the indication to activate the second BWP and/or based at least in part on the UE activating the second BWP.

As shown by reference number 440, the UE may activate the second BWP and/or monitor the second BWP for a control message. In some aspects, activating the second BWP may include configuring one or more components of the UE to monitor the second BWP and/or to deactivate the first BWP (e.g., to cease monitoring of the first BWP). In this way, the UE may conserve computing, power, and/or communication resources based at least in part on activating a BWP with a relatively small bandwidth size and deactivating a BWP with a large bandwidth size.

As shown by reference number 445, the UE may transmit, and the base station may receive, one or more BSRs after activating the second BWP and/or monitoring the second BWP for a control message. As describe with reference to reference number 425, the one or more BSRs may include indices to indicate whether the UE has data buffered for transmission. The UE may transmit the one or more BSRs via MAC signaling (e.g., MAC CEs) and/or may transmit the one or more BSRs via separate communications (e.g., separated in time).

As shown by reference number 450, the base station may determine whether the one or more BSRs satisfy the BSR threshold and/or whether to activate the first BWP. In some aspects, the base station may determine that the one or more BSRs have an average BSR index that is greater than the BSR threshold and may determine to activate the first BWP based at least in part on the first BWP having a bandwidth size that is larger than a bandwidth size of the second BWP. In some aspects, the base station may determine that the one or more BSRs have an average BSR index that is less than the BSR threshold and may determine to activate the first BWP based at least in part on the first BWP having a bandwidth size that is smaller than a bandwidth size of the second BWP.

In some aspects, the base station may update one or more parameters of the BSR threshold based at least in part on one or more conditions, such as traffic conditions of the cell associated with the base station. For example, the base station may update the BSR threshold and/or the length of the time period associated with the BSR threshold based at least in part on traffic conditions of the cell.

As shown by reference number 455, the UE may receive, and the base station may transmit, an indication to activate the first BWP. In some aspects, the UE may receive the indication to activate the first BWP via DCI, MAC signaling, and/or RRC signaling, among other examples.

As shown by reference number 460, the UE may activate the first BWP and/or monitor the first BWP for a control message. In some aspects, activating the first BWP may include configuring one or more components of the UE to monitor the first BWP and/or to deactivate the second BWP (e.g., to cease monitoring of the second BWP).

Based at least in part on the UE monitoring a BWP with a size that is based at least in part on the amount of traffic associated with the UE, the UE may conserve computing, communication, and/or power resources. For example, the UE may conserve computing, communication, and/or power resources that may have otherwise been used to monitor the first BWP that has a size that is unnecessarily large relative to an amount of traffic associated with the UE.

As indicated above, FIG. 4 is provided as an example. Other examples may differ from what is described with regard to FIG. 4.

Figure 5:
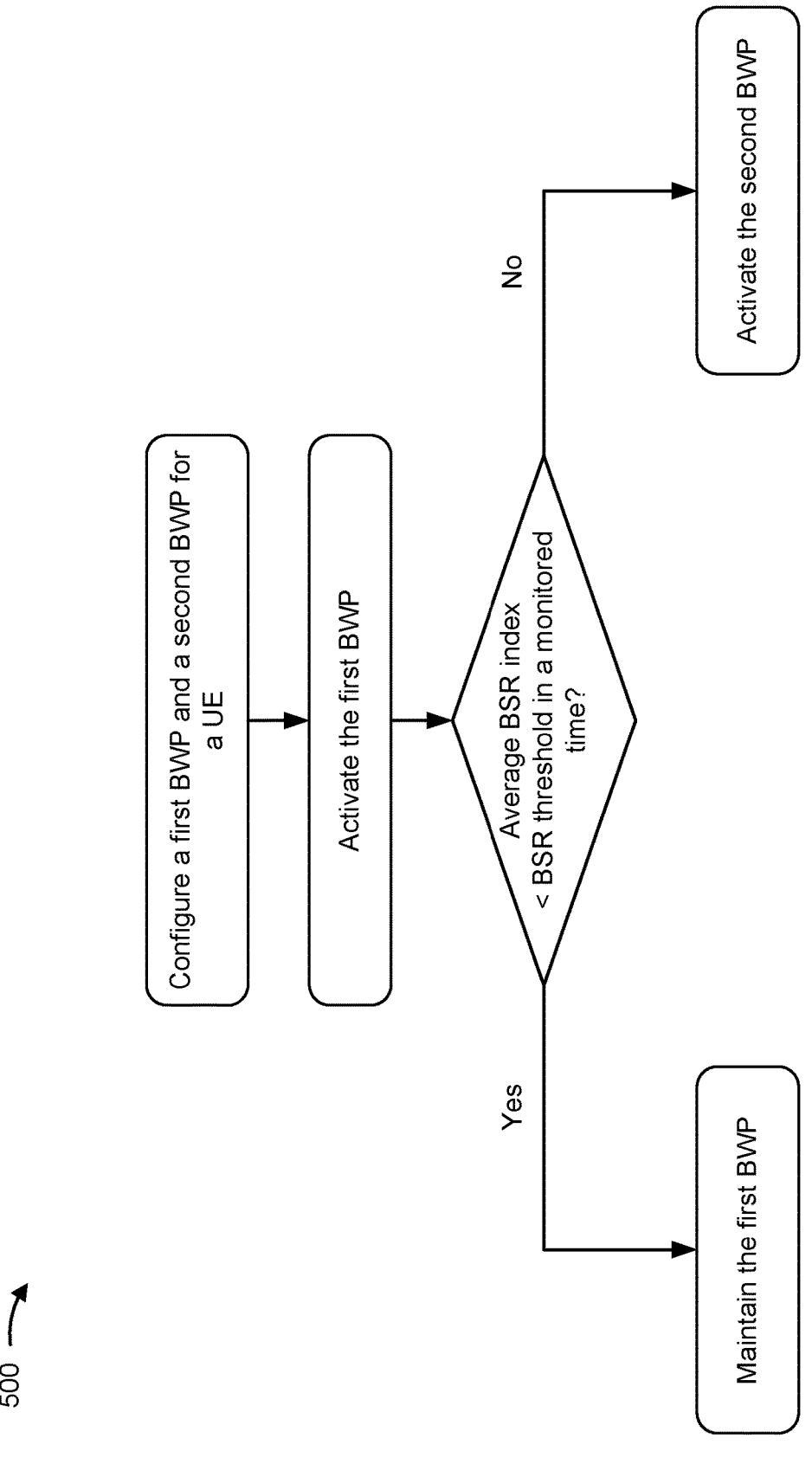

FIG. 5 is a diagram illustrating an example 500 associated with dynamic bandwidth part switching for control message monitoring, in accordance with the present disclosure. As shown in FIG. 5, a UE (e.g., UE 120) may communicate with a base station (e.g., base station 110). In some aspects, the UE may be in an RRC connected state. The UE and the base station may be part of a wireless network (e.g., wireless network 100).

As shown in FIG. 5, a base station may configure a first BWP (e.g., a BWP with a full bandwidth) and a second BWP (e.g., a BWP with a relatively small bandwidth) for a UE. For example, the base station may indicate a configuration for monitoring the first BWP for a control message when the first BWP is activated and may indicate a configuration for monitoring the second BWP for a control message when the second BWP is activated. Based at least in part on the base station configuring the first BWP and the second BWP, the base station may indicate (e.g., dynamically) whether the UE is to monitor the first BWP for a control message or to monitor the second BWP for a control message.

As further shown in FIG. 5, the base station may determine whether an average BSR index, of one or more BSRs received from the UE, is less than a BSR threshold in a monitored time (e.g., T_mon). As described herein, the base station may determine one or more parameters and/or update one or more parameters of the BSR threshold and/or a length of the monitored time. For example, the base station may determine one or more parameters and/or update one or more parameters based at least in part on traffic and/or congestion of a cell associated with the base station.

As further shown in FIG. 5, the base station may maintain the first BWP based at least in part on the average BSR index being less than the BSR threshold in the monitored time. Based at least in part on the base station maintaining the first BWP, the base station may continue to use resources of the first BWP to transmit control messages and the UE may continue to monitor the first BWP for the control messages. Alternatively, the base station may activate the second BWP based at least in part on the average BSR index being greater than the BSR threshold in the monitored time. Based at least in part on the base station activating the second BWP, the base station may begin to use resources of the second BWP (e.g., and to cease using resources of the first BWP) to transmit control messages and the UE may begin to monitor the second BWP (e.g., and to cease monitoring the first BWP) for the control messages.

As indicated above, FIG. 5 is provided as an example. Other examples may differ from what is described with regard to FIG. 5.

Figure 6:
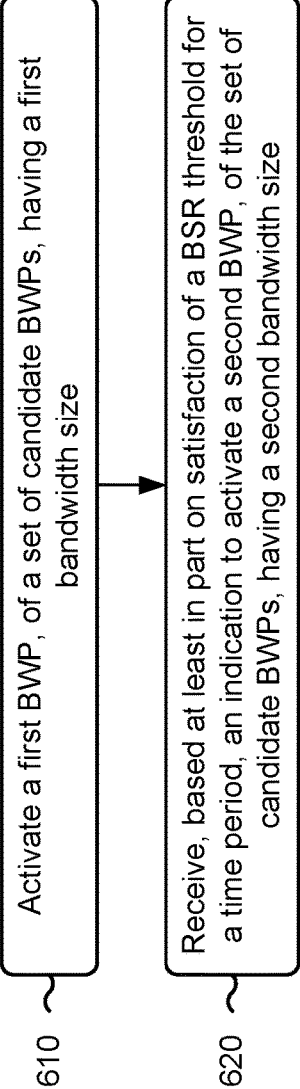
FIGS. 6 and 7 are diagrams illustrating example processes associated with dynamic bandwidth part switching for control message monitoring, in accordance with the present disclosure.

FIG. 6 is a diagram illustrating an example process 600 performed, for example, by a UE, in accordance with the present disclosure. Example process 600 is an example where the UE (e.g., UE 120) performs operations associated with dynamic bandwidth part switching for control message monitoring.

As shown in FIG. 6, in some aspects, process 600 may include activating a first BWP, of a set of candidate BWPs, having a first bandwidth size (block 610). For example, the UE (e.g., using communication manager 808, depicted in FIG. 8) may activate a first BWP, of a set of candidate BWPs, having a first bandwidth size, as described above (e.g., with reference to reference number 420 of FIG. 4).

As further shown in FIG. 6, in some aspects, process 600 may include receiving, based at least in part on satisfaction of a BSR threshold for a time period, an indication to activate a second BWP, of the set of candidate BWPs, having a second bandwidth size (block 620). For example, the UE (e.g., using reception component 802, depicted in FIG. 800) may receive, based at least in part on satisfaction of a BSR threshold for a time period, an indication to activate a second BWP, of the set of candidate BWPs, having a second bandwidth size, as described above (e.g., with reference to reference number 435 of FIG. 4).

Process 600 may include additional aspects, such as any single aspect or any combination of aspects described below and/or in connection with one or more other processes described elsewhere herein.

In a first aspect, activating the first BWP comprises configuring the UE to monitor resources within the first BWP for a control message, and wherein activating the second BWP comprises configuring the UE to monitor the second BWP for a control message.

In a second aspect, alone or in combination with the first aspect, activating the second BWP further comprises deactivating the first BWP.

In a third aspect, alone or in combination with one or more of the first and second aspects, process 600 includes activating the first BWP, after activating the second BWP, based at least in part on one or more of reception of an indication to activate the first BWP, or satisfaction of a BWP switching time.

In a fourth aspect, alone or in combination with one or more of the first through third aspects, process 600 includes receiving a BWPs configuration that indicates configurations of the set of candidate BWPs.

In a fifth aspect, alone or in combination with one or more of the first through fourth aspects, process 600 includes transmitting one or more BSRs that include BSR indices to indicate whether the UE has data buffered for transmission.

In a sixth aspect, alone or in combination with one or more of the first through fifth aspects, transmitting the one or more BSRs comprises transmitting the one or more BSRs via medium access control signaling.

In a seventh aspect, alone or in combination with one or more of the first through sixth aspects, the first bandwidth size is a largest of bandwidth sizes of the candidate BWPs.

In an eighth aspect, alone or in combination with one or more of the first through seventh aspects, satisfaction of the BSR threshold for the time period comprises transmitting one or more BSRs with an average BSR index that is less than the BSR threshold, wherein the first bandwidth size is larger than the second bandwidth size.

In a ninth aspect, alone or in combination with one or more of the first through eighth aspects, satisfaction of the BSR threshold for the time period comprises transmitting one or more BSRs with an average BSR index that is greater than the BSR threshold, wherein the second bandwidth size is larger than the first bandwidth size.

In a tenth aspect, alone or in combination with one or more of the first through ninth aspects, the BSR threshold is based at least in part on traffic conditions of a cell associated with a base station that is associated with the indication to activate the second BWP.

In an eleventh aspect, alone or in combination with one or more of the first through tenth aspects, receiving the indication to activate the second BWP comprises receiving the indication to activate the second BWP via one or more of downlink control information, medium access control signaling, or radio resource control signaling.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
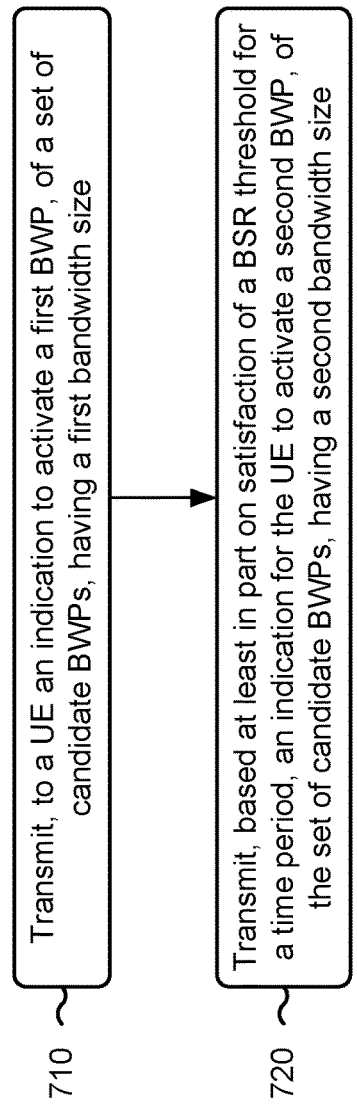

FIG. 7 is a diagram illustrating an example process 700 performed, for example, by a base station, in accordance with the present disclosure. Example process 700 is an example where the base station (e.g., base station 110) performs operations associated with dynamic bandwidth part switching for control message monitoring.

As shown in FIG. 7, in some aspects, process 700 may include transmitting, to a UE an indication to activate a first BWP, of a set of candidate BWPs, having a first bandwidth size (block 710). For example, the base station (e.g., using transmission component 904, depicted in FIG. 9) may transmit, to a UE an indication to activate a first BWP, of a set of candidate BWPs, having a first bandwidth size, as described above (e.g., with reference to reference number 415 of FIG. 4).

As further shown in FIG. 7, in some aspects, process 700 may include transmitting, based at least in part on satisfaction of a BSR threshold for a time period, an indication for the UE to activate a second BWP, of the set of candidate BWPs, having a second bandwidth size (block 720). For example, the base station (e.g., using transmission component 904, depicted in FIG. 9) may transmit, based at least in part on satisfaction of a BSR threshold for a time period, an indication for the UE to activate a second BWP, of the set of candidate BWPs, having a second bandwidth size, as described above (e.g., with reference to reference number 435 of FIG. 4).

Process 700 may include additional aspects, such as any single aspect or any combination of aspects described below and/or in connection with one or more other processes described elsewhere herein.

In a first aspect, process 700 includes transmitting, after transmitting the indication for the UE to activate the second BWP, an indication for the UE to activate the first BWP.

In a second aspect, alone or in combination with the first aspect, process 700 includes transmitting a BWPs configuration that indicates configurations of the set of candidate BWPs.

In a third aspect, alone or in combination with one or more of the first and second aspects, process 700 includes receiving, from the UE, one or more BSRs that include BSR indices to indicate whether the UE has data buffered for transmission.

In a fourth aspect, alone or in combination with one or more of the first through third aspects, receiving the one or more BSRs comprises receiving the one or more BSRs via medium access control signaling.

In a fifth aspect, alone or in combination with one or more of the first through fourth aspects, the first bandwidth size is a largest of bandwidth sizes of the candidate BWPs.

In a sixth aspect, alone or in combination with one or more of the first through fifth aspects, satisfaction of the BSR threshold for the time period comprises receiving one or more BSRs with an average BSR index that is less than the BSR threshold, wherein the first bandwidth size is larger than the second bandwidth size.

In a seventh aspect, alone or in combination with one or more of the first through sixth aspects, satisfaction of the BSR threshold for the time period comprises receiving one or more BSRs with an average BSR index that is greater than the BSR threshold, wherein the second bandwidth size is larger than the first bandwidth size.

In an eighth aspect, alone or in combination with one or more of the first through seventh aspects, process 700 includes determining the BSR threshold based at least in part on traffic conditions of a cell associated with the base station.

In a ninth aspect, alone or in combination with one or more of the first through eighth aspects, process 700 includes determining a length of the time period based at least in part on traffic conditions of a cell associated with the base station.

In a tenth aspect, alone or in combination with one or more of the first through ninth aspects, transmitting the indication for the UE to activate the second BWP comprises transmitting the indication for the UE to activate the second BWP via one or more of downlink control information, medium access control signaling, or radio resource control signaling.

In an eleventh aspect, alone or in combination with one or more of the first through tenth aspects, process 700 includes transmitting a control message via resources of the second BWP based at least in part on transmitting the indication for the UE to activate the second BWP.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
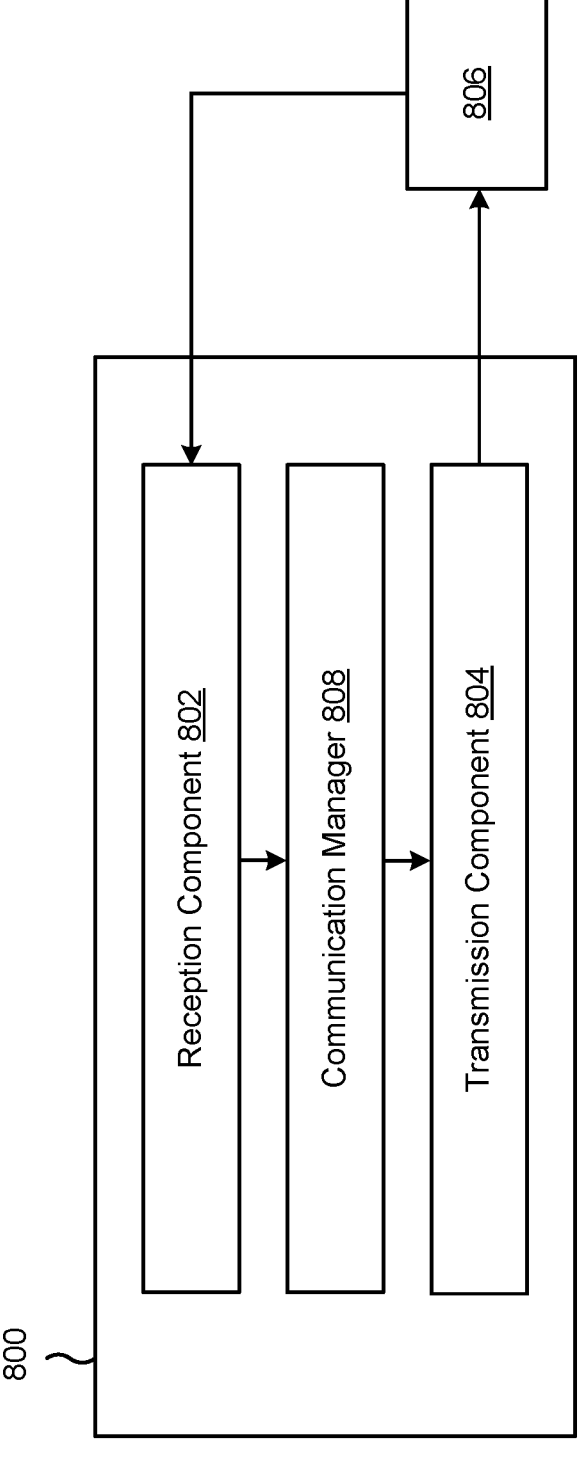
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIGS. 4 and 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The communication manager 808 may activate a first BWP, of a set of candidate BWPs, having a first bandwidth size. The reception component 802 may receive, based at least in part on satisfaction of a BSR threshold for a time period, an indication to activate a second BWP, of the set of candidate BWPs, having a second bandwidth size.

The communication manager 808 may activate the first BWP, after activating the second BWP, based at least in part on one or more of reception of an indication to activate the first BWP, or satisfaction of a BWP switching time.

The reception component 802 may receive a BWPs configuration that indicates configurations of the set of candidate BWPs.

The transmission component 804 may transmit one or more BSRs that include BSR indices to indicate whether the UE has data buffered for transmission.

The reception component 802 may receive a control message via resources of the second BWP based at least in part on receiving the indication for the UE to activate the second BWP.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
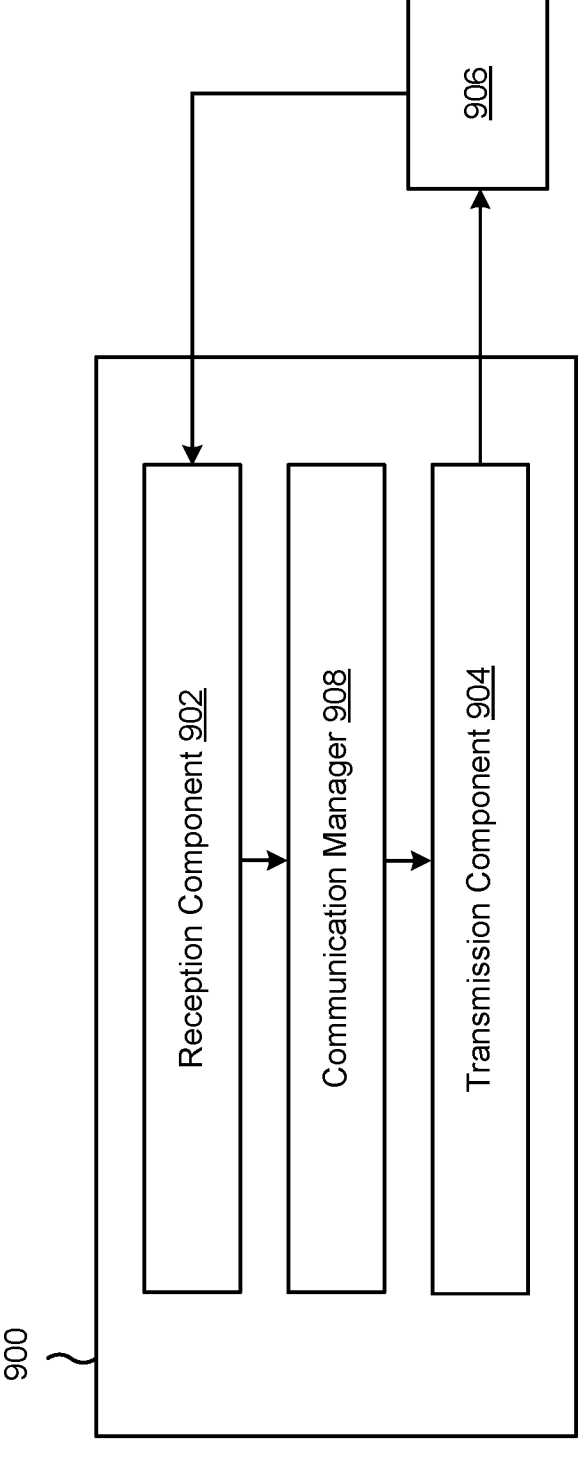

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908.

In some aspects, the apparatus 900 may be configured to perform one or more operations described herein in connection with FIGS. 4 and 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The transmission component 904 may transmit, to a UE an indication to activate a first BWP, of a set of candidate BWPs, having a first bandwidth size. The transmission component 904 may transmit, based at least in part on satisfaction of a BSR threshold for a time period, an indication for the UE to activate a second BWP, of the set of candidate BWPs, having a second bandwidth size.

The transmission component 904 may transmit, after transmitting the indication for the UE to activate the second BWP, an indication for the UE to activate the first BWP.

The transmission component 904 may transmit a BWPs configuration that indicates configurations of the set of candidate BWPs.

The reception component 902 may receive, from the UE, one or more BSRs that include BSR indices to indicate whether the UE has data buffered for transmission.

The communication manager 908 may determine the BSR threshold based at least in part on traffic conditions of a cell associated with the base station.

The communication manager 908 may determine a length of the time period based at least in part on traffic conditions of a cell associated with the base station.

The transmission component 904 may transmit a control message via resources of the second BWP based at least in part on transmitting the indication for the UE to activate the second BWP.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: activating a first bandwidth part (BWP), of a set of candidate BWPs, having a first bandwidth size; and receiving, based at least in part on satisfaction of a buffer status report (BSR) threshold for a time period, an indication to activate a second BWP, of the set of candidate BWPs, having a second bandwidth size.

Aspect 2: The method of Aspect 1, wherein activating the first BWP comprises configuring the UE to monitor resources within the first BWP for a control message, and wherein activating the second BWP comprises configuring the UE to monitor the second BWP for a control message.

Aspect 3: The method of any of Aspects 1 through 2, wherein activating the second BWP further comprises deactivating the first BWP.

Aspect 4: The method of any of Aspects 1 through 3, further comprising: activating the first BWP, after activating the second BWP, based at least in part on one or more of: reception of an indication to activate the first BWP, or satisfaction of a BWP switching time.

Aspect 5: The method of any of Aspects 1 through 4, further comprising: receiving a BWPs configuration that indicates configurations of the set of candidate BWPs.

Aspect 6: The method of any of Aspects 1 through 5, further comprising: transmitting one or more BSRs that include BSR indices to indicate whether the UE has data buffered for transmission.

Aspect 7: The method of Aspect 6, wherein transmitting the one or more BSRs comprises transmitting the one or more BSRs via medium access control signaling.

Aspect 8: The method of any of Aspects 1 through 7, wherein the first bandwidth size is a largest of bandwidth sizes of the candidate BWPs.

Aspect 9: The method of any of Aspects 1 through 8, wherein satisfaction of the BSR threshold for the time period comprises: transmitting one or more BSRs with an average BSR index that is less than the BSR threshold, wherein the first bandwidth size is larger than the second bandwidth size.

Aspect 10: The method of any of Aspects 1 through 7, wherein satisfaction of the BSR threshold for the time period comprises: transmitting one or more BSRs with an average BSR index that is greater than the BSR threshold, wherein the second bandwidth size is larger than the first bandwidth size.

Aspect 11: The method of any of Aspects 1 through 10, wherein the BSR threshold is based at least in part on traffic conditions of a cell associated with a base station that is associated with the indication to activate the second BWP.

Aspect 12: The method of any of Aspects 1 through 10, wherein receiving the indication to activate the second BWP comprises: receiving the indication to activate the second BWP via one or more of downlink control information, medium access control signaling, or radio resource control signaling.

Aspect 13: The method of Aspect 13, further comprising: receiving a control message via resources of the second BWP based at least in part on receiving the indication for the UE to activate the second BWP.

Aspect 14: A method of wireless communication performed by a base station, comprising: transmitting, to a user equipment (UE) an indication to activate a first bandwidth part (BWP), of a set of candidate BWPs, having a first bandwidth size; and transmitting, based at least in part on satisfaction of a buffer status report (BSR) threshold for a time period, an indication for the UE to activate a second BWP, of the set of candidate BWPs, having a second bandwidth size.

Aspect 15: The method of Aspect 14, further comprising: transmitting, after transmitting the indication for the UE to activate the second BWP, an indication for the UE to activate the first BWP.

Aspect 16: The method of any of Aspects 14 through 15, further comprising: transmitting a BWPs configuration that indicates configurations of the set of candidate BWPs.

Aspect 17: The method of any of Aspects 14 through 16, further comprising: receiving, from the UE, one or more BSRs that include BSR indices to indicate whether the UE has data buffered for transmission.

Aspect 18: The method of any of Aspects 14 through 17, wherein receiving the one or more BSRs comprises receiving the one or more BSRs via medium access control signaling.

Aspect 19: The method of any of Aspects 14 through 18, wherein the first bandwidth size is a largest of bandwidth sizes of the candidate BWPs.

Aspect 20: The method of any of Aspects 14 through 19, wherein satisfaction of the BSR threshold for the time period comprises: receiving one or more BSRs with an average BSR index that is less than the BSR threshold, wherein the first bandwidth size is larger than the second bandwidth size.

Aspect 21: The method of any of Aspects 14 through 17, wherein satisfaction of the BSR threshold for the time period comprises: receiving one or more BSRs with an average BSR index that is greater than the BSR threshold, wherein the second bandwidth size is larger than the first bandwidth size.

Aspect 22: The method of any of Aspects 14 through 21, further comprising: determining the BSR threshold based at least in part on traffic conditions of a cell associated with the base station.

Aspect 23: The method of any of Aspects 14 through 22, further comprising: determining a length of the time period based at least in part on traffic conditions of a cell associated with the base station.

Aspect 24: The method of any of Aspects 14 through 23, wherein transmitting the indication for the UE to activate the second BWP comprises: transmitting the indication for the UE to activate the second BWP via one or more of downlink control information, medium access control signaling, or radio resource control signaling.

Aspect 25: The method of any of Aspects 14 through 24, further comprising: transmitting a control message via resources of the second BWP based at least in part on transmitting the indication for the UE to activate the second BWP.

Aspect 26: An apparatus for wireless communication at a device, comprising a processor; memory coupled with the processor; and instructions stored in the memory and executable by the processor to cause the apparatus to perform the method of one or more Aspects of Aspects 1-25.

Aspect 27: A device for wireless communication, comprising a memory and one or more processors coupled to the memory, the memory and the one or more processors configured to perform the method of one or more Aspects of Aspects 1-25.

Aspect 28: An apparatus for wireless communication, comprising at least one means for performing the method of one or more Aspects of Aspects 1-25.

Aspect 29: A non-transitory computer-readable medium storing code for wireless communication, the code comprising instructions executable by a processor to perform the method of one or more Aspects of Aspects 1-25.

Aspect 30: A non-transitory computer-readable medium storing a set of instructions for wireless communication, the set of instructions comprising one or more instructions that, when executed by one or more processors of a device, cause the device to perform the method of one or more Aspects of Aspects 1-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, wherein the UE is configured to:
      activate a first bandwidth part (BWP), of a set of candidate BWPs, having a first bandwidth size; and
      receive, based at least in part on an average buffer status report (BSR) index, of one or more BSRs transmitted by the UE, satisfying a BSR threshold for a time period, an indication to activate a second BWP, of the set of candidate BWPs, having a second bandwidth size.

2. The UE of claim 1, wherein, to activate the first BWP, the UE is configured to monitor resources within the first BWP for a control message, and
   wherein, to activate the second BWP, the one or more processors, when activating the second BWP, configure the UE is configured to monitor the second BWP for a control message.

3. The UE of claim 1,
   wherein the UE is configured to deactivate the first BWP in association with activating the second BWP.

4. The UE of claim 1 wherein the UE is further configured to:
   activate the first BWP, after activating the second BWP, based at least in part on one or more of:
      reception of an indication to activate the first BWP, or
      satisfaction of a BWP switching time.

5. The UE of claim 1,
   wherein the UE is further configured to:
      receive a BWP configuration that indicates configurations of the set of candidate BWPs.

6. The UE of claim 1,
   wherein the UE is further configured to:
      transmit the one or more BSRs that include BSR indices to indicate whether the UE has data buffered for transmission.

7. The UE of claim 6, wherein, to transmit the one or more BSRs, the UE is configured to transmit the one or more BSRs via medium access control signaling.

8. The UE of claim 1,
   wherein the first bandwidth size is a largest bandwidth size of bandwidth sizes of the candidate BWPs.

9. The UE of claim 1,
   wherein satisfaction of the BSR threshold for the time period comprises the average BSR index being less than the BSR threshold, and
   wherein the first bandwidth size is larger than the second bandwidth size.

10. The UE of claim 1,
   wherein satisfaction of the BSR threshold for the time period comprises the average BSR index being greater than the BSR threshold, and
   wherein the second bandwidth size is larger than the first bandwidth size.

11. The UE of claim 1,
   wherein the BSR threshold is based at least in part on traffic conditions of a cell associated with a base station that is associated with the indication to activate the second BWP.

12. The UE of claim 1, wherein, to receive the indication to activate the second BWP, the UE is configured to:
   receive the indication to activate the second BWP via one or more of downlink control information, medium access control signaling, or radio resource control signaling.

13. The UE of claim 1,
   wherein the UE is further configured to:
      receive a control message via resources of the second BWP based at least in part on receiving the indication for the UE to activate the second BWP.

14. A method of wireless communication performed by a user equipment (UE), comprising:
   activating a first bandwidth part (BWP), of a set of candidate BWPs, having a first bandwidth size; and
   receiving, based at least in part on an average buffer status report (BSR) index, of one or more BSRs transmitted by the UE, satisfying a BSR threshold for a time period, an indication to activate a second BWP, of the set of candidate BWPs, having a second bandwidth size.

15. The method of claim 14,
   wherein activating the first BWP comprises configuring the UE to monitor resources within the first BWP for a control message, and
   wherein activating the second BWP comprises configuring the UE to monitor the second BWP for a control message.

16. The method of claim 14, further comprising
   deactivating the first BWP in association with activating the second BWP.

17. The method of claim 14, further comprising:
   activating the first BWP, after activating the second BWP, based at least in part on one or more of:
      reception of an indication to activate the first BWP, or
      satisfaction of a BWP switching time.

18. The method of claim 14, further comprising:
   receiving a BWP configuration that indicates configurations of the set of candidate BWPs.

19. The method of claim 14, further comprising:
   transmitting the one or more BSRs that include BSR indices to indicate whether the UE has data buffered for transmission.

20. The method of claim 19, wherein transmitting the one or more BSRs comprises transmitting the one or more BSRs via medium access control signaling.

21. The method of claim 14, wherein the first bandwidth size is a largest bandwidth size of bandwidth sizes of the candidate BWPs.

22. The method of claim 14, wherein satisfaction of the BSR threshold for the time period comprises the average BSR index being less than the BSR threshold, and wherein the first bandwidth size is larger than the second bandwidth size.

23. The method of claim 14, wherein satisfaction of the BSR threshold for the time period comprises the average BSR index being greater than the BSR threshold, and wherein the second bandwidth size is larger than the first bandwidth size.

24. The method of claim 14, wherein the BSR threshold is based at least in part on traffic conditions of a cell associated with a base station that is associated with the indication to activate the second BWP.

25. The method of claim 14, wherein receiving the indication to activate the second BWP comprises:

receiving the indication to activate the second BWP via one or more of downlink control information, medium access control signaling, or radio resource control signaling.

26. The method of claim 14, further comprising:

receiving a control message via resources of the second BWP based at least in part on receiving the indication for the UE to activate the second BWP.

27. A non-transitory computer-readable medium having a set of instructions stored thereon for wireless communication, the set of instructions comprising:

one or more instructions that, when executed by one or more processors of a user equipment (UE), cause the UE to:

activate a first bandwidth part (BWP), of a set of candidate BWPs, having a first bandwidth size; and receive, based at least in part on an average buffer status report (BSR) index, of one or more BSRs transmitted by the UE, satisfying a BSR threshold for a time period, an indication to activate a second BWP, of the set of candidate BWPs, having a second bandwidth size.

28. The non-transitory computer-readable medium of claim 27, wherein the one or more instructions, that cause the UE to activate the first BWP, cause the UE to configure the UE to monitor resources within the first BWP for a control message, and wherein the one or more instructions, that cause the UE to activate the second BWP, cause the UE to configure the UE to monitor the second BWP for a control message.

29. An apparatus for wireless communication, comprising:

means for activating a first bandwidth part (BWP), of a set of candidate BWPs, having a first bandwidth size; and means for receiving, based at least in part on an average buffer status report (BSR) index, of one or more BSRs transmitted by the apparatus, satisfying a BSR threshold for a time period, an indication to activate a second BWP, of the set of candidate BWPs, having a second bandwidth size.

30. The apparatus of claim 29, wherein the means for activating the first BWP comprises means for configuring the apparatus to monitor resources within the first BWP for a control message, and wherein the means for activating the second BWP comprises means for configuring the apparatus to monitor the second BWP for a control message.

* * * * *